(12) United States Patent
Shukla et al.

(10) Patent No.: US 11,493,913 B2
(45) Date of Patent: Nov. 8, 2022

(54) SYSTEM AND METHOD FOR MONITORING HEALTH AND PREDICTING FAILURE OF AN ELECTRO-MECHANICAL MACHINE

(71) Applicant: L&T TECHNOLOGY SERVICES LIMITED, Chennai (IN)

(72) Inventors: Shailendra Shukla, Navi Mumbai (IN); Mayur J Dhameliya, Vadodara (IN); Ratheen Chaturvedi, Mumbai (IN); Santosh Jadhav, Nashik (IN); Uddipan Paul, Banarhat (IN); Siddhant Malhotra, New Delhi (IN)

(73) Assignee: L&T TECHNOLOGY SERVICES LIMITED, Tamil Nadu (IN)

( * ) Notice: Subject to any disclaimer, the term of this patent is extended or adjusted under 35 U.S.C. 154(b) by 94 days.

(21) Appl. No.: 17/042,664

(22) PCT Filed: Mar. 28, 2019

(86) PCT No.: PCT/IB2019/052543
§ 371 (c)(1),
(2) Date: Sep. 28, 2020

(87) PCT Pub. No.: WO2019/186453
PCT Pub. Date: Oct. 3, 2019

(65) Prior Publication Data
US 2021/0124342 A1    Apr. 29, 2021

(30) Foreign Application Priority Data

Mar. 28, 2018   (IN) .............................. 201841011615

(51) Int. Cl.
*G05B 23/02* (2006.01)
*G06N 20/00* (2019.01)
*G06F 11/30* (2006.01)

(52) U.S. Cl.
CPC ..... *G05B 23/0254* (2013.01); *G05B 23/0283* (2013.01); *G06F 11/3058* (2013.01); *G06N 20/00* (2019.01)

(58) Field of Classification Search
CPC ............ G05B 23/0254; G05B 23/0283; G05B 23/0216; G06F 11/3058; G06F 11/076;
(Continued)

(56) References Cited

U.S. PATENT DOCUMENTS 5,566,092 A  * 10/1996 Wang ....................... G07C 3/00
                                                                    706/912
6,728,658 B1 *  4/2004 Bechhoefer ........ G01N 29/4445
                                                                    702/183
(Continued)

*Primary Examiner* — Mohammad K Islam

(57) ABSTRACT

This disclosure relates to a method and system for monitoring health and predicting failure of an electro-mechanical machine. In an embodiment, the method may include receiving a plurality of operational parameters with respect to the electro-mechanical machine and determining a set of features and a set of events, based on the plurality of operational parameters. The method may further include detecting one or more fault signatures associated the electro-mechanical machine based on at least one of the plurality of operational parameters, the set of features, or the set of events. The method may further include determining at least one of a time to the possible failure and a remaining useful life of the electro-mechanical machine based on at least one of the plurality of operational parameters, the set of features, the set of events, or the one or more fault signature, by using a hybrid machine learning model.

16 Claims, 3 Drawing Sheets

(58) Field of Classification Search
CPC .. G06F 11/3013; G06F 11/3447; G06N 20/00
See application file for complete search history.

(56) References Cited

U.S. PATENT DOCUMENTS

| | | | | |
|---|---|---|---|---|
| 7,254,520 B2* | 8/2007 | Hashemian | ........ | G05B 23/0283 |
| | | | | 714/25 |
| 7,308,322 B1* | 12/2007 | Discenzo | ........... | G05B 23/0221 |
| | | | | 702/182 |
| 8,326,577 B2* | 12/2012 | Graham, III | ....... | G05B 23/0237 |
| | | | | 702/181 |
| 8,332,337 B2* | 12/2012 | Harrison | .............. | G06N 3/0436 |
| | | | | 700/47 |
| 8,886,574 B2* | 11/2014 | Yuan | .................. | G05B 23/0229 |
| | | | | 706/904 |
| 10,124,893 B1* | 11/2018 | Aalund | .................. | G07C 5/006 |
| 2004/0078171 A1* | 4/2004 | Wegerich | ........... | G05B 23/0281 |
| | | | | 702/188 |
| 2005/0096873 A1* | 5/2005 | Klein | ..................... | G01H 1/006 |
| | | | | 702/184 |
| 2005/0222747 A1* | 10/2005 | Vhora | ................. | G05B 23/0254 |
| | | | | 701/31.4 |
| 2007/0067114 A1* | 3/2007 | D'Amato | ........... | G05B 23/0278 |
| | | | | 702/34 |
| 2008/0141072 A1* | 6/2008 | Kalgren | .................... | G01D 3/08 |
| | | | | 714/33 |
| 2008/0262795 A1* | 10/2008 | Webb | .................. | G05B 23/0283 |
| | | | | 702/183 |
| 2009/0037772 A1* | 2/2009 | Wegerich | ................ | G06N 5/025 |
| | | | | 714/E11.002 |
| 2010/0023307 A1* | 1/2010 | Lee | .................... | G05B 23/0254 |
| | | | | 703/7 |
| 2013/0024415 A1* | 1/2013 | Herzog | ................ | G06K 9/6215 |
| | | | | 706/52 |
| 2013/0268229 A1* | 10/2013 | Gleeson, III | ....... | G01R 31/2849 |
| | | | | 702/108 |
| 2014/0136178 A1* | 5/2014 | Meagher | .................. | G06N 20/00 |
| | | | | 703/18 |
| 2015/0356521 A1* | 12/2015 | Sridhar | .................... | E21B 17/20 |
| | | | | 705/305 |
| 2018/0157249 A1* | 6/2018 | Muto | ..................... | G06F 16/289 |
| 2022/0060446 A1* | 2/2022 | Dalvi | .................. | H04L 63/1425 |

* cited by examiner

SYSTEM AND METHOD FOR MONITORING HEALTH AND PREDICTING FAILURE OF AN ELECTRO-MECHANICAL MACHINE

TECHNICAL FIELD

This disclosure relates generally to monitoring of electro-mechanical machines, particularly, to a system and a method for monitoring health and predicting failure of electro-mechanical machines.

BACKGROUND

Monitoring of electro-mechanical machines, such as induction motors, plays an important role in predictive failure of the electro-mechanical machines, and hence maintenance of the electro-mechanical machines. It may be understood that predictive failure is a technique for determining a condition of an object, in order to predict a maintenance requirement for the object. Based on the predictive failure, corrective measures (maintenance) for the electro-mechanical machines may be scheduled, which may help in preventing unexpected failure of these electro-mechanical machines.

Conventional techniques of monitoring of the electro-mechanical machines involve manually inspecting and testing the electro-mechanical machines. The manual inspection may include manually monitoring a large number of working parameters, such as winding resistance, direct current (DC) step response, surge, etc., of the electro-mechanical machines. Further, the conventional techniques require disconnecting or removing the load from the electro-mechanical machines for carrying out monitoring operations. Also, the monitoring operations are needed to be performed periodically, in order to prevent abrupt breakdowns. As a result, these conventional techniques lead to frequent obstruction of continuous operations of the electro-mechanical machines, even when these machines are operating in good condition. Because of the frequent obstructions, productivity and efficiency of these electro-mechanical machines is compromised. Furthermore, as the conventional techniques rely on manual intervention for carrying out the monitoring operations, possibility of error and overall cost remains high.

Some techniques are known in which multiple inputs are periodically received automatically from the electro-mechanical machines. These multiple inputs are then used to detect a condition of the electro-mechanical machine, based on which a degradation stage of the electro-mechanical machine is determined (for example, if the electro-mechanical machine is in an early degradation stage or a late degradation stage). Further, on detecting the condition, a user may be alerted to perform maintenance steps in order to prevent further degradation.

However, it is observed that in such techniques, the degradation of the electro-mechanical machine does not synchronize with the detected condition. This may be due to a delay between a current degradation of the electro-mechanical machine and the condition detected. Such delays, therefore, make the monitoring operations futile, and fail to prevent breakdown of the electro-mechanical machines. As a result, efficiency of these electro-mechanical machines is reduced. Moreover, due to the failure of the monitoring operations, there remains an uncertainty in the in the working of the electro-mechanical machines.

SUMMARY

In one embodiment, a method for monitoring health and predicting failure of an electro-mechanical machine is disclosed. In an embodiments, the method may include receiving a plurality of operational parameters with respect to the electro-mechanical machine, and determining a set of features and a set of events associated with the electro-mechanical machine based on the plurality of operational parameters. The method may further include detecting one or more fault signatures associated the electro-mechanical machine based on at least one of the plurality of operational parameters, the set of features, or the set of events by referring to a plurality of pre-defined fault signatures, wherein the one or more fault signatures are indicative of a possible fault, and wherein the plurality of pre-defined fault signatures is provided in a fault signature library deployed on the monitoring device. The method may further include determining at least one of a time to the possible failure and a remaining useful life of the electro-mechanical machine based on at least one of the plurality of operational parameters, the set of features, the set of events, or the one or more fault signature by using a hybrid machine learning model, wherein the hybrid machine learning model is pre-trained multi-dimensional multi-variable machine learning model deployed on the monitoring device and is based on domain knowledge with respect to the electro-mechanical machine. The method may further include providing at least one of the time to the possible failure and the remaining useful life of the electro-mechanical machine for rendering.

In another embodiment, a system for monitoring health and predicting failure of an electro-mechanical machine is disclosed. The system may include a monitoring device including at least one processor and a computer-readable medium storing instructions. The instructions when executed by the at least one processor, may cause the at least one processor to receive a plurality of operational parameters with respect to the electro-mechanical machine, and determine a set of features and a set of events associated with the electro-mechanical machine based on the plurality of operational parameters. The instructions upon execution, may further cause the at least one processor to detect one or more fault signatures associated the electro-mechanical machine based on at least one of the plurality of operational parameters, the set of features, or the set of events by referring to a plurality of pre-defined fault signatures, wherein the one or more fault signatures are indicative of a possible fault, and wherein the plurality of pre-defined fault signatures is provided in a fault signature library deployed on the monitoring device. The instructions upon execution, may further cause the at least one processor to determine at least one of a time to the possible failure and a remaining useful life of the electro-mechanical machine based on at least one of the plurality of operational parameters, the set of features, the set of events, or the one or more fault signature by using a hybrid machine learning model, wherein the hybrid machine learning model is pre-trained multi-dimensional multi-variable machine learning model deployed on the monitoring device and is based on domain knowledge with respect to the electro-mechanical machine. The instructions upon execution, may further cause the at least one processor to render at least one of the time to the possible failure and the remaining useful life of the electro-mechanical machine to a user via a user interface.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
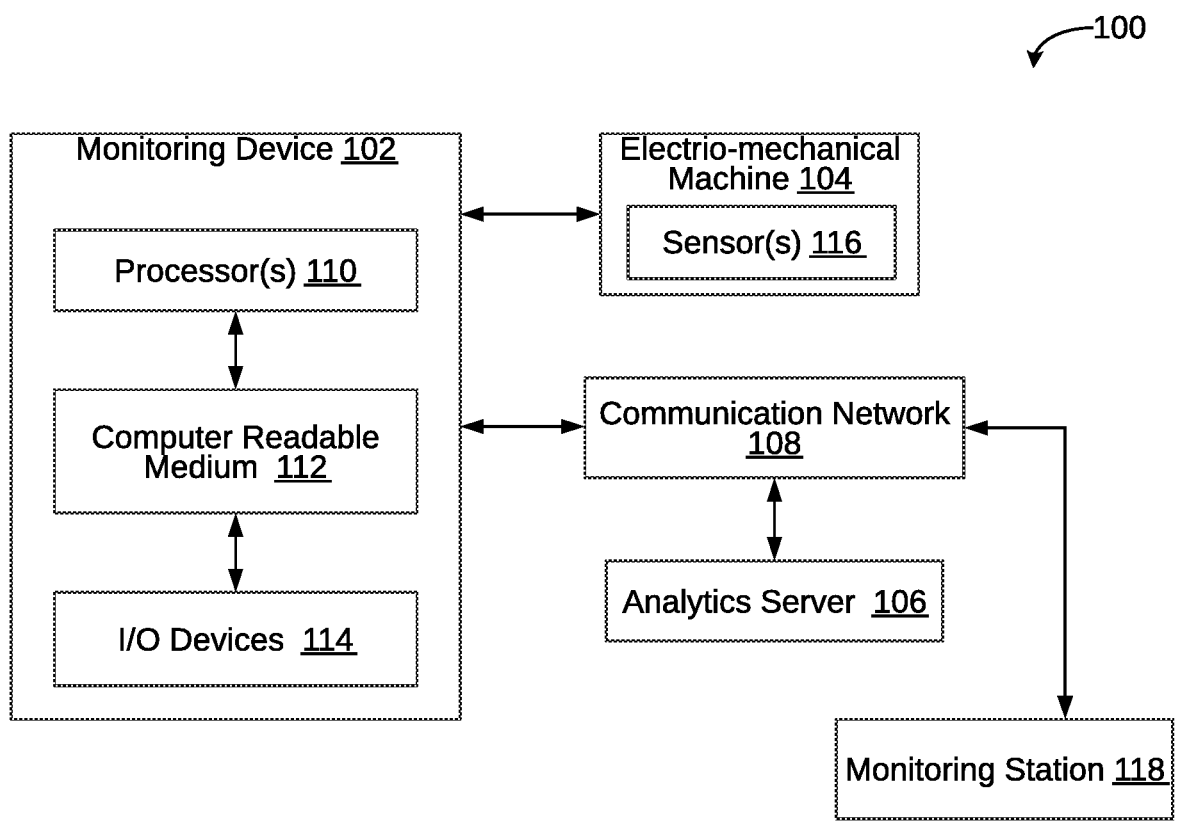
FIG. 1 is a block diagram of an exemplary system for monitoring health and predicting failure of an electro-mechanical machine, in accordance with some embodiments of the present disclosure.

Referring now to FIG. 1, an exemplary system 100 for monitoring health and predicting failure of an electro-mechanical machine, is illustrated, in accordance with some embodiments of the present disclosure. The system may include a monitoring device 102 coupled to the electro-mechanical machine 104, for monitoring health and predicting failure of the electro-mechanical machine 104. In some embodiments, the electro-mechanical machine 104 may include, but may not be limited to, a rotating object which rotates in a circular movement around an axis or a centre of rotation of the object. By way of an example, the electro-mechanical machine 104 may be a diesel generator, a chiller, a pump, a chiller particularly of a cooling tower, a lobe blower, a compressor, an air handling unit (AHU), a Vektor fan, a distribution transformer, a high tension (HT) Panel, a diesel rotary uninterruptible power supply (DRUPS), a computer room air conditioning (CRACS), a drop lift, an induction motor, a conveyor, a shuttle, a parallel linear positioner (PLP), a switchgear (contact life) a carbonate grinder, a mixer, a refuge truck (condition based monitoring), an exhaust fan, a grinder, an elevator, an escalator, a pressure vessel, a boiler, special purpose machines, a packaging machine, a gear box, a computer numerical control (CNC) machine, a boiler, a turbine, an X-ray generator, a ventilator, a chemistry analyzer, a medical refrigerator, a treadmill, an overhead crane, a crane, etc.

In some embodiments, the electro-mechanical machine 104 may include one or more sensors 116. The one or more sensors 116 may obtain one or more parameters with respect to the electro-mechanical machine 104. In some embodiments, the one or more sensors 116 may be communicatively coupled to the electro-mechanical machine 104 at one or more critical positions of the electro-mechanical machine 104. It may be understood that the one or more critical positions may include one or more locations on the electro-mechanical machine 104 that allow for obtaining the one or more parameters by the one or more sensors 116 with highest accuracy. The one or more sensors 116 may further generate one or more signals representative of the one or more operational parameters.

As will be described in greater detail in conjunction with FIGS. 2-3, the monitoring device 102 may receive a plurality of operational parameters with respect to the electro-mechanical machine 104. The monitoring device 102 may further determine a set of features and a set of events associated with the electro-mechanical machine 104 based on the plurality of operational parameters. The monitoring device 102 may further detect one or more fault signatures associated the electro-mechanical machine 104 based on at least one of the plurality of operational parameters, the set of features, or the set of events by referring to a plurality of pre-defined fault signatures. The monitoring device 102 may further determine at least one of a time to the possible failure and a remaining useful life of the electro-mechanical machine 104 based on at least one of the plurality of operational parameters, the set of features, the set of events, or the one or more fault signature by using a hybrid machine learning model. The monitoring device 102 may further provide at least one of the time to the possible failure and the remaining useful life of the electro-mechanical machine 104 for rendering. In some embodiments, the monitoring device 102 may be implemented as an edge device on the electro-mechanical machine 104. As will be appreciate by those skilled in the art, an edge device may provide an entry point into an enterprise or service provider core networks.

The monitoring device 102 may include, but may not be limited to server, desktop, laptop, notebook, netbook, smartphone, and mobile phone. In particular, the monitoring device 102 may include one or more processors 110, a computer-readable medium (e.g. a memory) 112, and input/output devices 114. The computer-readable storage medium 112 may store the instructions that, when executed by the processors 110, cause the one or more processors 110 to perform various functions in order to monitor health and predicting failure of the electro-mechanical machine 104, in accordance with aspects of the present disclosure. The computer-readable storage medium 112 may also store various data (e.g. operational parameters data, set of features data, set of events data, fault signatures data, fault signature library data, hybrid machine learning model data, domain knowledge data, feature health index data, overall health value data, time to the possible failure data, remaining useful life data, mean time to repair (MTTR) data, mean time between failures (MTBF) data, etc.) that may be captured, processed, and/or required by the monitoring device 102. The monitoring device 102 may interact with a user (not shown) via the input/output devices 114.

The system 100 may further include an analytics server 106 communicatively coupled to the monitoring device 102, via a communication network 108. In some embodiments, the communication network 108 may be a wired communication network, such as an Ethernet or Local Area Network (LAN). Alternately, the communication network 108 may be a wireless communication network, such as a wireless fidelity (Wi-Fi) network, a Bluetooth network, a Bluetooth low energy (BLE) network, etc. The analytics server 106 may include, but may not be limited to server, desktop, laptop, notebook, netbook, smartphone, and mobile phone. In particular, the analytics server 106 may include one or more processors, a computer-readable medium (e.g. a memory), and input/output devices. The computer-readable storage medium may store the instructions that, when executed by the one or more processors, cause the one or more processors to perform various functions in order to monitor health and predicting failure of the electro-mechanical machine 104, in accordance with aspects of the present disclosure. The computer-readable storage medium may also store various data (e.g. hybrid machine learning model data, set of features data, set of events data, fault signatures data, fault signature library data, time to the possible failure data, remaining useful life data, MTTR data, MTBF data, etc.) that may be captured, processed, and/or required by the analytics server 106. The analytics server 106 may be implemented in one of a cloud network, a local server, or a database (for e.g. MySQL, Oracle, etc.).

During operation, the monitoring device 102 may receive the plurality of operational parameters with respect to the electro-mechanical machine 104, from the one or more sensors 116. It may be understood that the one or more sensors 116 may obtain a plurality of operational parameters with respect to the electro-mechanical machine 104. The one or more parameters may include current, voltage, speed (for example rotation per minute (RPM)), vibration (frequency and amplitude), temperature, pressure, load weight etc. relating to the electro-mechanical machine 104. As such, the one or more sensors 116 may include a current sensor (for e.g. a 3-axial vibration sensor), a voltage sensor, a speed sensor (for example, a tachometer), a vibration sensor, a temperature, and so on.

In some embodiments, the one or more sensors 116 may obtain the one or more signals in a frequency domain. It may be noted that obtaining the one or more signals in the frequency domain may imply analyzing a mathematical function or the one or more signals with respect to frequency. In alternate embodiments, the one or more sensors 116 may obtain the one or more signals in a time domain. In such embodiments, upon obtaining the one or more signals in the time domain, one or more signals in the frequency domain may be generated, corresponding to the one or more signals obtained in the time domain, using spectral analysis. For example, the spectral analysis may be applied on at least two signals representative of vibrations in the electro-mechanical machine 104, in order to obtain one or more vibrational spectral quantities. The vibrational spectral quantities may include harmonics of acceleration, velocity, and displacement of the electro-mechanical machine 104.

In some embodiments, the monitoring device 102 may determine a set of features and a set of events associated with the electro-mechanical machine 104 based on the plurality of operational parameters. The set of features may include at least an overload count, an overheat count, a high vibrational count, a high pressure count, a high current count, a high rotational count, a weighted vibration anomaly count, etc. It may be understood that each feature of the set of features may indicate a condition of the electro-mechanical machine 104. For example, the overload count may indicate a load value that exceeds a predefined load value of the electro-mechanical machine 104. Similarly, the overheat count may indicate a temperature value (due to heat produced) of electro-mechanical machine 104 when the temperature value exceeds a pre-defined temperature value. The high vibrational count may indicate a vibrational value when the vibration value of the electro-mechanical machine 104 exceeds a pre-defined vibrational value. For example, the high vibrational count may be due to a faulty bearing, a loose pulley or flywheel or belt, lack of oil in crankcase, etc. The high pressure count may indicate value of pressure exerted by the electro-mechanical machine 104 when the value exceeds a pre-defined value. The high current count may indicate a value of current flow through the electro-mechanical machine 104 when the count exceeds a pre-defined count. A high rotational count may indicate RPM of the electro-mechanical machine 104 (for example, a rotating electro-mechanical machine, like an induction motor) when the RPM exceeds a pre-defined RPM. A weighted vibration anomaly count may indicate a count of a combination of a total frequency and an overall health of the electro-mechanical machine 104, when the count of the combination exceeds a pre-defined count.

In some embodiments, the monitoring device 102 may determine the set of features by correlating the plurality of parameters. Alternatively or additionally, the monitoring device 102 may determine the set of features by directly measuring the features on the electro-mechanical machine 104, or by computing the features based on the plurality of operational parameters. It may be noted that the set of features may be multi-dimensional in nature. By way of an example, as it will be appreciated, vibration is a three-dimensional (existing in 'x', 'y' and 'z' coordinates) parameter. Upon correlation of a multiple number of operational parameters, the monitoring device 102 may determine a feature set having that in multiple dimensions (For example, using operational parameters in having nine dimensions, the monitoring device 102 may determine a feature set having twenty dimensions).

In some embodiments, the monitoring device 102 may determine the set of features and the set of events based on at least two of the plurality of operational parameters. In other words, the set of features and the set of events may be determined based on combination of at least two operational parameters, such as current and temperature, or temperature and vibration, or vibration and pressure, or load weight and rotations per minute, etc. In other words, the set of features and the set of events may be derived from the determined plurality of operational parameters.

In some embodiments, the monitoring device 102 may determine the set of features and the set of events (based on the plurality of operational parameters) using a hybrid machine learning model. As it will be appreciated by those skilled in the art, a machine learning model is an application of artificial intelligence, which provides a computing system an ability to progressively learn with data without being explicitly programmed by a user. It may be noted that the hybrid machine learning model may be a pre-trained multi-dimensional multi-variable machine learning model deployed on the monitoring device 102. It may be further noted that the hybrid machine learning model may be trained on the analytics server 106. The hybrid machine learning model may be based on a type of the electro-mechanical machine 104 and domain knowledge with respect to the electro-mechanical machine 104.

In some embodiments, the hybrid machine learning model may assign various weights to the plurality of operational parameters to determine the set of features and the set of events. Further, an accelerated life test (ALT) may be performed on the hybrid machine learning model, where the weights are assigned by a user, and tested against the data created using simulation tools.

In some embodiments, the monitoring device 102 may detect one or more fault signatures associated with the electro-mechanical machine 104, based on at least one of the plurality of operational parameters, the set of features, or the set of events, by referring to a plurality of pre-defined fault signatures. The one or more fault signatures may be indicative of a possible fault. By way of an example, the faults may include a halted or jammed operation, excessive noise, excessive vibration, etc. of the electro-mechanical machine 104. In some embodiments, the plurality of pre-defined fault signatures may be provided in a fault signature library deployed on the monitoring device 102. Further, the one or more detected fault signatures may be appended to the hybrid machine learning model in order to train the hybrid machine learning model.

In some embodiments, the monitoring device 102 may provide an indication to a user about the faults present in the electro-mechanical machine 104. By way of an example, the monitoring device 102 may cause to provide the indication via a plurality of light emitting diodes (LEDs), coupled to the monitoring device 102. The LEDs may be configured to blink with a predefined frequency based on a level of the fault detected in the electro-mechanical machine 104. Accordingly, a user may be able to decipher a fault and the level of the fault, based on the frequency of blinking of the LEDs. In some embodiments, the monitoring device 102 may predict if a fault is going to happen in the future or not, based on the operational parameters and the fault signatures.

In some embodiments, the monitoring device 102 may receive an updated fault signature library at a periodical interval from the analytics server 106. It may be further noted that the analytics server 106 may be communicatively coupled to a plurality of monitoring devices. Each of the plurality of monitoring devices may periodically send field data to the analytics server 106. The field data may include the plurality of operational parameters, the set of features, the set of events, the one or more fault signatures, the time to the possible failure, and the remaining useful life. Based on the field data received from the plurality of monitoring devices, the analytics server 106 may generate the updated fault signature library. Once the updated fault signature library is generated, the monitoring device 102 may receive the updated fault signature library from the analytics server 106, and may update the fault signature library with the updated fault signature library. It may be understood that the analytics server may be periodically tuned with the field data.

The monitoring device 102 may further determine at least one of a time to a possible failure (TTPF) and a remaining useful life (RUL) of the electro-mechanical machine 104. The TTPF may indicate an average time in which the electro-mechanical machine 104 is expected fail or degrade completely. The RUL may indicate an average number of hours before which the electro-mechanical machine 104 may fail or degrade completely. The monitoring device 102 may determine the TTPF and RUL based on at least one of the plurality of operational parameters, the set of features, the set of events, or the one or more fault signature by using a hybrid machine learning model. In some embodiments, the TTPF and the RUL may be determined by comparing a value of a corresponding output of the hybrid machine learning model with a corresponding threshold value.

In some embodiments, the monitoring device 102 may receive an updated hybrid machine learning model at a periodical interval from the analytics server 106. The analytics server 106 generate the updated hybrid machine learning model based on the field data received from the plurality of monitoring devices. Upon receiving the updated hybrid machine learning model, the monitoring device 102 may update the hybrid machine learning model with the updated hybrid machine learning model.

The domain knowledge with respect to the electro-mechanical machine 104 may include at least one of a simulated model of the electromechanical machine 104 (including one or more sub-component models of the electromechanical machine 104), a known behavior of the electro-mechanical machine 104, a simulated behavior of the electro-mechanical machine 104, or a historical field behavior of the electro-mechanical machine 104 installed in similar environment. The known behavior of the electro-mechanical machine 104 may be derived from inherent knowledge of the electro-mechanical machine 104 (i.e. knowledge based on the physics of the electro-mechanical machine 104). Further, the known behavior may include known operational parameters, known features, known events, known faults, etc. The simulated behavior may be derived from knowledge gained from the simulated model, and may include simulated operation parameters, simulated features, etc. The historical field behavior may be derived from similar electro-mechanical machine 104 installed in a similar environment, and may include actual filed operational parameters. The domain knowledge may further provide for mapping various the possible combinations of faults and events possible in the electro-mechanical machine 104.

In some embodiments, the monitoring device 102 may determine a feature health index associated with each feature of the set of features. It may be noted that the feature health index associated with a feature may indicate health (i.e. condition) of the electro-mechanical machine 104, with respect to that associated feature. By way of an example, the feature health index associated with temperature may indicate if the temperature of the electro-mechanical machine 104 is within normal limits of not. By way of an example, the feature health index may be calculated according to the mathematical relation, presented below:

$$\text{Health Index value} = 1 - \{(\text{overload count} + \text{overheat count} + \text{high vibrational count} + \text{high pressure count} + \text{high current count} + \text{high rotational count} + \text{weighted vibration anomaly count}) / (\text{total current observations} + \text{total temperature observations} + \text{total vibration observations} + \text{total pressure observations} + \text{total load weight observations} + \text{total rotations per minute observations})\}$$

where, $$\text{weighted vibrational count} = \Sigma_{i=0}^{3}(w_{zone,i} * n_{vib,i})$$

$w_{zone,i}$=weight associated with the predefined zone=i, $n_{vib,i}$=number of observations of every frequency belonging to the predefined zone=i The monitoring device 102 may further compute an overall health value of the electro-mechanical machine 104. The monitoring device 102 may compute the overall health value based on the each of the feature health indexes associated with each feature of the set of features. It may be noted that the overall health value may indicate the health (i.e. condition) of the electro-mechanical machine 104. By way of an example, the overall health value may indicate a level of functioning or efficiency of the electro-mechanical machine 104, to work in a desired manner, i.e. whether the electro-mechanical machine 104 is operating as desired or not. It may be understood that the overall health value may correspond to a degradation state of the electro-mechanical machine 104, indicating lowering of performance or deterioration of condition of the electro-mechanical machine 104. In some embodiments, upon determining the overall health value, the monitoring device 102 may further determine an indication of a possible failure of the electro-mechanical machine 104, based on the computed overall health value of the electro-mechanical machine 104. By way of an example, the indication of a possible failure may include a probability or a risk of failure of the electro-mechanical machine 104 within a time period in the future.

The monitoring device 102 may provide the time to the possible failure and the remaining useful life of the electro-mechanical machine for rendering. In some embodiments, the monitoring device 102 may further provide each of the feature health index and the indication of the possible failure to a user via a user interface. For example, the monitoring device 102 may render each of the feature health index and the indication of the possible failure on a screen of a display device.

In some embodiments, the monitoring device 102 may render the feature health index, the overall health value of the electro-mechanical machine, the time to the possible failure (TTPF), or the remaining useful life (RUL) in one of a plurality of predefined colour zones for the feature health index, overall health value, the time to the possible failure, or the remaining useful life, respectively. By way of an example, the feature health index associated with temperature rendered in a green color zone may indicate that the electro-mechanical machine 104 is operating in safe temperature range, while the feature health index rendered in a red color zone may indicate that the electro-mechanical machine 104 is operating at dangerously high temperature range. It may be understood that the feature health index, the overall health value of the electro-mechanical machine, the time to the possible failure, or the remaining useful life may be rendered in any manner other than in a plurality of predefined color zones, without deviating from the scope of the invention. Further, the plurality of predefined color zones may be arranged in an ascending of degradation of the electro-mechanical machine 104. In some embodiments, the monitoring device 102 may render the computed overall health and the TTPF in form of one or more graphs or one or more insights.

In some embodiments, the monitoring device 102 may render the computed overall health of the electro-mechanical machine 104 in one of a plurality of predefined color zones. For example, the plurality of predefined color zones may include a green zone, a yellow zone, an orange zone and a red zone representing a degradation state of the electro-mechanical machine 104 in an ascending order of the degradation state. The green zone may represent a least degradation state i.e. the electro-mechanical machine 104 is in good working condition. The red zone may represent the highest degradation state i.e. the electro-mechanical machine 104 is in a bad working condition. In such embodiments, the degradation state of electro-mechanical machine 104 may not descent from the red zone to the green zone, until maintenance a maintenance activity is performed on the electro-mechanical machine 104.

In some embodiments, the system 100 may further include a monitoring station 118 communicatively coupled to the monitoring device 102. The monitoring station 118 may include a display module (not shown in FIG. 1). The monitoring station 118 may render the feature health index, the indication of the possible failure, the TTPF, the RUL, the computed overall health, and one or more faults relating to the electro-mechanical machine 104. The monitoring station 118 may further generate various alarms or notifications in response to detection of a fault in the electro-mechanical machine 104.

The monitoring device 102 may further determine other factors. By way of an example, the monitoring device 102 may determine a mean time to repair (MTTR) for the electro-mechanical machine 104 or a mean time between failures (MTBF) for the electro-mechanical machine 104, using the hybrid machine learning model. It may be noted that the MTTR and the MTBF may be part of field data of the electro-mechanical machine 104. It may be understood that the MTTR may indicate that the electro-mechanical machine 104 or a component of the electro-mechanical machine 104 is in need of repairing. The MTTR may further indicate an average time required to carry out the repairing of a failed component of the electro-mechanical machine 104 or of the electro-mechanical machine 104 in general. For example, the MTTR may indicate that a bearing of the electro-mechanical machine 104 needs replacement, and may further indicate an average time require to replace the bearing. The MTBF may indicate an average time between the next failure and the subsequent failure of the electro-mechanical machine 104. The need for maintenance may indicate of the next maintenance activity is needed ahead of the scheduled maintenance.

Figure 2:
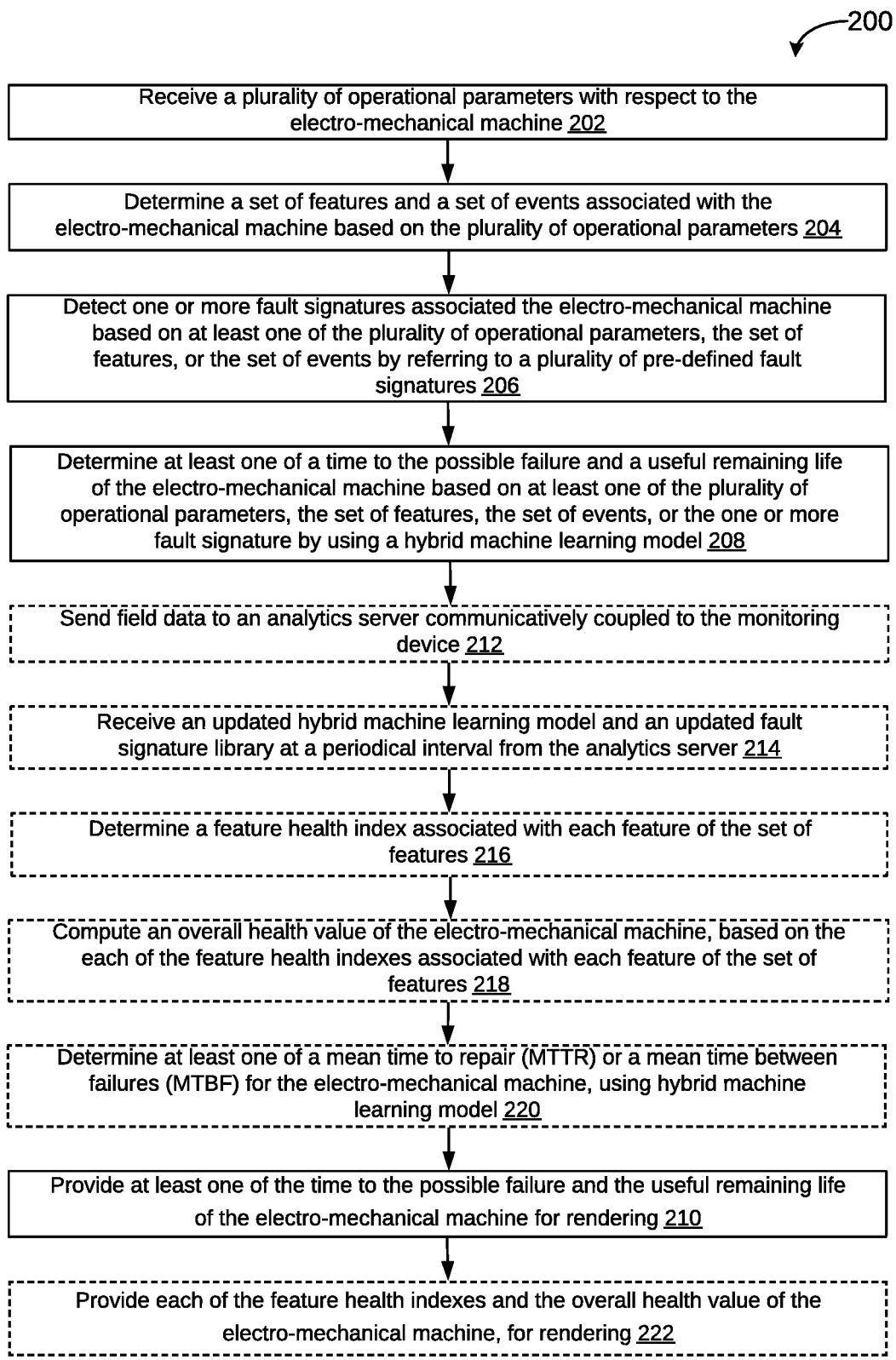
FIG. 2 is a flow diagram of an exemplary process for monitoring health and predicting failure of an electro-mechanical machine, in accordance with some embodiments of the present disclosure.

Referring now to FIG. 2, an exemplary overview process 200 for monitoring health and predicting failure of an electro-mechanical machine 104 is depicted via a flowchart, in accordance with some embodiments of the present disclosure. In some embodiments, the process 200 may be performed by a monitoring device 102 (of a system 100) communicatively coupled to the electro-mechanical machine 104 for monitoring health and predicting failure of the electro-mechanical machine 104.

At step 202, a plurality of operational parameters with respect to the electro-mechanical machine 104 may be received. At step 204, a set of features and a set of events associated with the electro-mechanical machine 104 may be determined based on the plurality of operational parameters. At step 206, one or more fault signatures associated with the electro-mechanical machine 104 may be detected based on at least one of the plurality of operational parameters, the set of features, or the set of events by referring to a plurality of pre-defined fault signatures. At step 208, at least one of a time to the possible failure and a remaining useful life of the electro-mechanical machine 104 may be determined based on at least one of the plurality of operational parameters, the set of features, the set of events, or the one or more fault signature by using a hybrid machine learning model. At step 210, at least one of the time to the possible failure and the remaining useful life of the electro-mechanical machine 104 may be provided for rendering. Additionally, at step 212, field data may be sent to an analytics server communicatively coupled to the monitoring device. At step 214, an updated hybrid machine learning model and an updated fault signature library may be received at a periodical interval from the analytics server. At step 216, a feature health index associated with each feature of the set of features may be determined. At step 218, an overall health value of the electro-mechanical machine 104 may be computed, based on the each of the feature health indexes associated with each feature of the set of features. At step 220, at least one of a mean time to repair (MTTR) or a mean time between failures (MTBF) for the electro-mechanical machine 104 may be determined, using hybrid machine learning model. At step 222, each of the feature health indexes and the overall health value of the electro-mechanical machine 104 may be provided for rendering 222

At step 202, the plurality of operational parameters with respect to the electro-mechanical machine 104 may be received. The plurality of operational parameters may include a load weight value, a temperature value, a vibration value, a pressure value, a current value, a rate of flow, and a revolution per minute (RPM) value. In some embodiments, the receiving of the one or more operational parameters may include receiving one or more signals representative of the one or more parameters. The one or more signals may be obtained by one or more sensors 116. For example, the one or more sensors 116 may include a load weight sensor, a temperature sensor, a vibration sensor, a pressure sensor, a current sensor, a flow sensor, a speed sensor, etc. It may be noted that the one or more sensors 116 may be communicatively coupled to the electro-mechanical machine 104.

In some embodiments, the one or more operational parameters may be received in a frequency domain. As such, the one or more signals may be obtained by the one or more sensors 116 in the frequency domain. In alternate embodiments, the one or more signals may be obtained in a time domain. In such embodiments, one or more signals in the frequency domain may be generated corresponding to the one or more signals in the time domain, using spectral analysis.

At step 204, the set of features and the set of events associated with the electro-mechanical machine 104 may be determined based on the plurality of operational parameters. The set of features may include at least overload count, overheat count, high vibrational count, high pressure count, high current count, high rotational count, or weighted vibration anomaly count. At step 206, the one or more fault signatures associated with the electro-mechanical machine 104 may be detected based on at least one of the plurality of operational parameters, the set of features, or the set of events by referring to a plurality of pre-defined fault signatures. It may be noted that the one or more fault signatures may be indicative of a possible fault. It may be further noted that a fault signature may be group of events, features, parameters that may indicate, in conjunction with each other, a future fault scenario based on similar observation in past. The plurality of pre-defined fault signatures may be provided in a fault signature library deployed on the monitoring device.

At step 208, at least one of the time to the possible failure and the remaining useful life of the electro-mechanical machine 104 may be determined based on at least one of the plurality of operational parameters, the set of features, the set of events, or the one or more fault signature by using the hybrid machine learning model. In some embodiments, the time to the possible failure or the remaining useful life may be determined by comparing a value of a corresponding output of the hybrid machine learning model with a corresponding threshold value. The hybrid machine learning model may be a pre-trained multi-dimensional multi-variable machine learning model deployed on the monitoring device 102.

The hybrid machine learning model may be based on domain knowledge with respect to the electro-mechanical machine 104. It may be noted that the domain knowledge with respect to the electro-mechanical machines 104 may include at least one of a simulated model of the electromechanical machine, a known behavior of the electro-mechanical machine 104, a simulated behavior of the electro-mechanical machine 104, or a historical field behavior of the electro-mechanical machine 104 installed in similar environment. The known behavior of the electro-mechanical machine 104 may be derived from inherent knowledge of the electro-mechanical machine 104 (i.e. knowledge based on the physics of the electro-mechanical machine 104). Further, the known behavior may include known operational parameters, known features, known events, known faults, etc. The simulated behavior may be derived from knowledge gained from the simulated model, and may include simulated operation parameters, simulated features, etc. The historical field behavior may be derived from similar electro-mechanical machine 104 installed in a similar environment, and may include actual filed operational parameters. The simulated model may be generated using one or more simulation tools, such as MATLAB and ANSYS. The simulated model may define transitions or boundary line conditions for various events and faults.

At step 212, the field data may be sent to the analytics server 106 communicatively coupled to the monitoring device 102. The field data may include the plurality of operational parameters, the set of features, the set of events, the one or more fault signatures, the time to the possible failure, and the remaining useful life. At step 214, the updated hybrid machine learning model and the updated fault signature library may be received at a periodical interval from the analytics server 106. The updated hybrid machine learning model and the updated fault signature library may be generated by the analytics server 106 based on the field data received from the plurality of monitoring devices. It may be understood that the updated hybrid machine learning model and the updated fault signature library may be employed for monitoring of health and predicting failure of the electro-mechanical machine 104.

At step 216, the feature health index associated with each feature of the set of features may be determined. At step 218, the overall health value of the electro-mechanical machine 104 may be computed, based on the each of the feature health indexes associated with each feature of the set of features. At step 220, at least one of the mean time to repair (MTTR) or the mean time between failures (MTBF) for the electro-mechanical machine 104 may be determined, using hybrid machine learning model. The hybrid machine learning model is further explained in detail, in conjunction with FIG. 3.

At step 222, each of the feature health indexes and the overall health value of the electro-mechanical machine 104 may be provided for rendering 222. At step 210, at least one of the time to the possible failure (TTPF) and the remaining useful life (RUL) of the electro-mechanical machine 104 may be provided for rendering. In some embodiments, the feature health index, the overall health value of the electro-mechanical machine 104, the time to the possible failure, or the remaining useful life may be rendered via a user interface, in one of a plurality of predefined color zones for the feature health index, overall health value, the time to the possible failure, or the remaining useful life, respectively. In some embodiments, the user interface may include a display screen provided on the electro-mechanical device 104. In alternate embodiments, the user interface may be provided on a monitoring station 118 communicatively to the electro-mechanical device 104.

Figure 3:
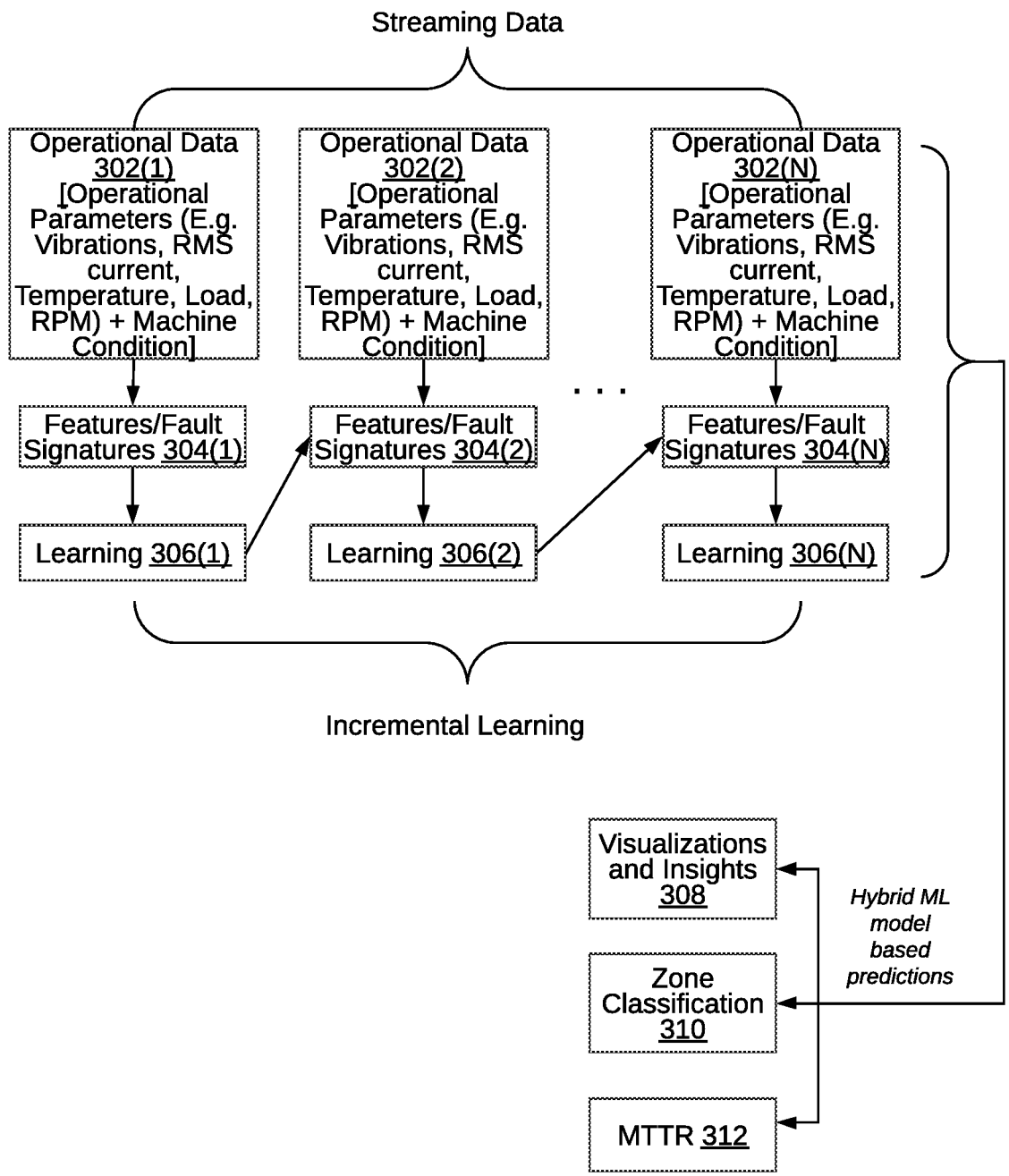
FIG. 3 is another block diagram of an exemplary system for monitoring health and predicting failure of an electro-mechanical machine, in accordance with some embodiments of the present disclosure.

Referring now to FIG. 3, an exemplary process 300 for monitoring health and predicting failure of an electro-mechanical machine 104 is depicted via a process diagram, in accordance with some embodiments of the present disclosure. In some embodiments, the process 300 may be performed by a system (corresponding to system 100 of FIG. 1). The system may include a plurality of electro-mechanical machines (corresponding to electro-mechanical machine 104 of FIG. 1). The system may further include a plurality of monitoring devices (corresponding to the monitoring device 102 of FIG. 1) and an analytics server (corresponding to the analytics server 106 of FIG. 1). Each of the plurality of monitoring devices may be coupled to an electro-mechanical machine of the plurality of electro-mechanical machines.

During operation, operational data 302(1), 302(2) . . . 302(N), collectively referred to as operational data 302, with respect to the plurality of electro-mechanical machines may be received by the analytics server from the plurality of monitoring devices. By way of an example, operational data 302(1) may correspond to a first electro-mechanical machine, operational data 302(2) may correspond to a second electro-mechanical machine, and so on. The operational data 302 may include one or more operational parameters, such as a load weight value, a temperature value, a vibration value, a pressure value, a current value, a rate of flow, and a revolution per minute (RPM) value. The operational data 302 may further include a condition or overall health of the associated electro-mechanical machine.

Upon receiving the operational data 302, the analytics server may extract one or more features and one or more fault signatures 304(1), 304(2) . . . 304(N), collectively referred to as features and fault signatures 304, from each of the plurality of monitoring devices. The analytics server may extract the features and the fault signatures based on the operational data 302. As mentioned earlier, the analytics server may include a hybrid machine learning model, which may be trained on the analytics server with the features and fault signatures 304. Upon extracting, the hybrid machine learning model of the analytics server may have incremental learning or supervised learning based on the features and the fault signatures. For example, the hybrid machine learning model may have first learning 306(1) based on the one or more features and one or more fault signatures 304(1) associated with the first electro-mechanical machine. Followed by the first learning 306(1), the hybrid machine learning model may have second learning 306(2) based on the one or more features and one or more fault signatures 304(2) associated with the second electro-mechanical machine, and so on.

Once the learning of the hybrid machine learning model is complete, the hybrid machine learning model may start making predictions. In particular, the hybrid machine learning model may start making predictions once they attain threshold accuracy based on live data. In some embodiments, the predictions may include one or more of visualizations and insights 308, zone classification 310, and mean time to repair (MTTR) 312. The visualizations and insights 308 and the MTTR 312 has already been explained in relation to FIG. 1. It may be understood that the zone classification 310 may include one or more output, such as a time to the possible failure and a remaining useful life of the electro-mechanical machine.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

As will be appreciated by those skilled in the art, the techniques described in the various embodiments discussed above provide for monitoring health and predicting failure of an electro-mechanical machine. In particular, the techniques provide for receiving a plurality of operational parameters, determining a set of features and a set of events, detecting one or more fault signatures, and determining a time to the possible failure and a useful remaining life. The techniques employ a hybrid machine learning model based on domain knowledge with respect to the electro-mechanical machine, for determining the time to the possible failure and the useful remaining life of the electro-mechanical machines.

By way of the above, the techniques provide for an automatic and intelligent way of monitoring electro-mechanical machines. The techniques do away with the need of manual intervention in monitoring, and thereby eliminate the possibilities of manual errors. Further, the techniques provide for a monitoring process which is time efficient and cost efficient, as compared to the manually performed monitoring. Further, the techniques do not require disconnecting or removing load from the electro-mechanical machines for the purpose of carrying out monitoring, and hence eliminate the need to halt the operations. This helps in improving the efficiency and productivity of the electro-mechanical machines. Moreover, the above techniques provide for accurate monitoring, as there are no or little chances of delay between a current degradation of the electro-mechanical machine and the condition detected. As a result, the monitoring is more reliable. The hybrid machine learning model is capable of incremental learning, which keeps learning various failures over time. This further helps in predicting failures, improving overall equipment effectiveness (OEE), informing relevant stakeholders, and taking necessary corrective measures. By way of implementing the monitoring device as an edge device, storage requirement and data transmission bandwidth, and associated costs are reduced. The monitoring station provides a comprehensive user interface, which provides alarms and notifications for alerting the user, in case of critical situations (for example, a fault) in the electro-mechanical machine.

It is intended that the disclosure and examples be considered as exemplary only, with a true scope and spirit of disclosed embodiments being indicated by the following claims.

We claim:

1. A method for monitoring health and predicting failure of an electro-mechanical machine, the method comprising:

receiving, by a monitoring device, a plurality of operational parameters with respect to the electro-mechanical machine; determining, by the monitoring device, a set of features and a set of events associated with the electro-mechanical machine based on the plurality of operational parameters; detecting, by the monitoring device, one or more fault signatures associated the electro-mechanical machine based on at least one of the plurality of operational parameters, the set of features, or the set of events by referring to a plurality of pre-defined fault signatures, wherein the one or more fault signatures are indicative of a possible fault, and wherein the plurality of pre-defined fault signatures is provided in a fault signature library deployed on the monitoring device; determining, by the monitoring device, at least one of a time to the possible failure and a remaining useful life of the electro-mechanical machine based on the plurality of operational parameters, the set of features, the set of events, and the one or more fault signatures by using a hybrid machine learning model, wherein the hybrid machine learning model is pre-trained multi-dimensional multi-variable machine learning model deployed on the monitoring device and is based on domain knowledge with respect to the electro-mechanical machine; and providing, by the monitoring device, at least one of the time to the possible failure and the remaining useful life of the electro-mechanical machine for rendering.

2. The method of claim 1, further comprising sending, by the monitoring device field data to an analytics server communicatively coupled to the monitoring device, wherein the field data comprises the plurality of operational parameters, the set of features, the set of events, the one or more fault signatures, the time to the possible failure, and the remaining useful life.

3. The method of claim 2, further comprising:
receiving, by the monitoring device, an updated hybrid machine learning model and an updated fault signature library at a periodical interval from the analytics server, wherein the updated hybrid machine learning model and the updated fault signature library is generated by the analytics server based on the field data received from a plurality of monitoring devices, and wherein the updated hybrid machine learning model and the updated fault signature library is employed for monitoring of health and predicting failure of the electro-mechanical machine.

4. The method of claim 1, further comprising:
determining, by the monitoring device, a feature health index associated with each feature of the set of features;
computing, by the monitoring device, an overall health value of the electro-mechanical machine, based on the each of the feature health indexes associated with each feature of the set of features; and
providing, by the monitoring device, each of the feature health indexes and the overall health value of the electro-mechanical machine, for rendering.

5. The method of claim 4, further comprising rendering, via a user interface, the feature health index, the overall health value of the electro-mechanical machine, the time to the possible failure, or the remaining useful life in one of a plurality of predefined color zones for the feature health index, overall health value, the time to the possible failure, or the remaining useful life, respectively.

6. The method of claim 1, further comprising determining at least one of a mean time to repair (MTTR) for the electro-mechanical machine or a mean time between failures (MTBF) for the electro-mechanical machine, using hybrid machine learning model, wherein the MTTR and the MTBF are part of field data of the electro-mechanical machine.

7. The method of claim 1, wherein determining the time to the possible failure or the remaining useful life comprises:
comparing a value of a corresponding output of the hybrid machine learning model with a corresponding threshold value.

8. The method of claim 1, wherein the domain knowledge with respect to the electro-mechanical machine comprises at least one of a simulated model of the electromechanical machine, a known behavior of the electro-mechanical machine, a simulated behavior of the electro-mechanical machine, or a historical field behavior of the electro-mechanical machine installed in similar environment.

9. The method of claim 1, wherein the plurality of operational parameters comprise a load weight value, a temperature value, a vibration value, a pressure value, a current value, a rate of flow, and a revolution per minute (RPM) value.

10. The method of claim 1, wherein the set of features comprise at least overload count, overheat count, high vibrational count, high pressure count, high current count, high rotational count, or weighted vibration anomaly count.

11. The method of claim 1, wherein receiving the plurality of operational parameters related to the electro-mechanical machine further comprises:
receiving one or more signals representative of the plurality of parameters, wherein the one or more signals are obtained by the one or more sensors, and wherein the one or more signals are obtained in a frequency domain.

12. The method of claim 11, wherein obtaining the one or more signals in the frequency domain further comprises:
obtaining one or more signals in a time domain; and
generating one or more signals in the frequency domain, corresponding to the one or more signals obtained in the time domain, using spectral analysis.

13. A system for monitoring health and predicting failure of an electro-mechanical machine, the method comprising:
a monitoring device-comprising at least one processor and a computer-readable medium storing instructions that, when executed by the at least one processor, cause the at least one processor to perform operations comprising: receiving a plurality of operational parameters with respect to the electro-mechanical machine; determining a set of features and a set of events associated with the electro-mechanical machine based on the plurality of operational parameters; detecting one or more fault signatures associated the electro-mechanical machine based on at least one of the plurality of operational parameters, the set of features, or the set of events by referring to a plurality of pre-defined fault signatures, wherein the one or more fault signatures are indicative of a possible fault, and wherein the plurality of pre-defined fault signatures is provided in a fault signature library deployed on the monitoring device; determining at least one of a time to the possible failure and a remaining useful life of the electro-mechanical machine-based on the plurality of operational parameters, the set of features, the set of events, and the one or more fault signatures by using a hybrid machine learning model, wherein the hybrid machine learning model is pre-trained multi-dimensional multi-variable machine learning model deployed on the monitoring device and is based on domain knowledge with respect to the electro-mechanical machine; and rendering at least one of the time to the possible failure and the remaining useful life of the electro-mechanical machine to a user via a user interface.

14. The system of claim 13, further comprising a one or more of sensors communicatively coupled to the monitoring device, the one or more sensors configured to acquire the plurality of operational parameters with respect to the electro-mechanical machine.

15. The system of claim 13, further comprising an analytics server communicatively coupled to the monitoring devices, the analytics server configured to:
- receive field data from the monitoring device and a plurality of other monitoring devices, wherein the field data comprises the plurality of operational parameters, the set of features, the set of events, the one or more fault signatures, the time to the possible failure, and the remaining useful life;
- generate an updated hybrid machine learning model and an updated fault signature library based on field data received from the monitoring device and the plurality of other monitoring devices; and
- send the updated hybrid machine learning model and the updated fault signature library to the monitoring device and the plurality of other monitoring devices.

16. The system of claim 13, further comprising a monitoring station communicatively coupled to the monitoring device, the monitoring station configured to render, via a user interface, the time to the possible failure or the remaining useful life in one of a plurality of predefined color zones for the health index or the time to the possible failure respectively.

* * * * *